Feb. 1, 1966     J. V. WALSH     3,232,661
GLOVE COMPARTMENT ASSEMBLY
Filed Dec. 23, 1963

INVENTOR.
JAMES V. WALSH
BY
Hanke & Hanke
ATTORNEYS

United States Patent Office 3,232,661
Patented Feb. 1, 1966

3,232,661
GLOVE COMPARTMENT ASSEMBLY
James V. Walsh, 32766 Winona Court, Garden City, Mich.
Filed Dec. 23, 1963, Ser. No. 332,358
4 Claims. (Cl. 296—37)

The present invention relates to automobile accessories and more particularly to an improved globe box or compartment for automobiles or other vehicles.

Heretofore glove boxes or compartments have generally taken the form of enclosed compartments constructed of cardboard or the like and secured within the dashboard of an automobile or vehicle. Access to such glove compartments is provided by a door hingedly connected to the dashboard. Such a construction for glove boxes or compartments offers several important disadvantages which are overcome by the construction of the present invention.

First, such glove compartments are difficult to assemble since the cardboard or similar sections which define the box must be secured one to the other and secured to the dashboard of the automobile or other vehicle in an area where space is quite limited and therefore where access is difficult. Secondly, it is difficult to find articles within the glove box and because generally the glove box or compartment is located on the passenger's side of the automobile, a dangerous situation is created where the driver must reach across the automobile to find some article located within the glove box.

It is an object then of the present invention to reduce the manufacturing and assembly costs of automobiles and other vehicles by providing an economically produced glove compartment assembly for such vehicles which can be produced and assembled separately from the automobile or other vehicle and then readily installed in the desired position within the dashboard of the vehicle.

It is another object of the present invention to increase the facility with which articles located within the glove box or compartment of an automobile can be found by providing an improved construction for such a compartment which permits the box to be removed completely from the dashboard.

Figure 2:
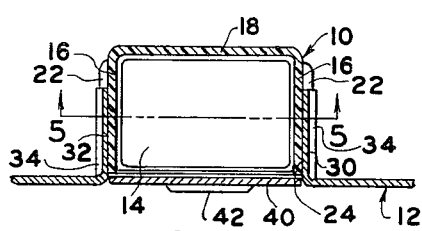
Figure 3:
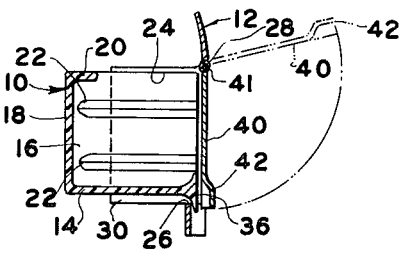
Figure 6:
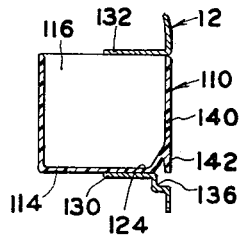
Figure 4:
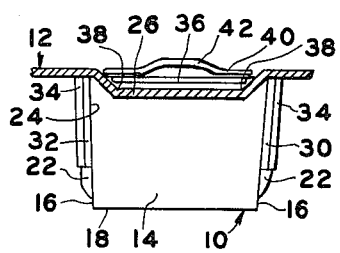
Figure 8:
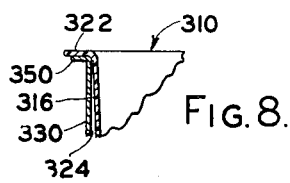
Figure 1:
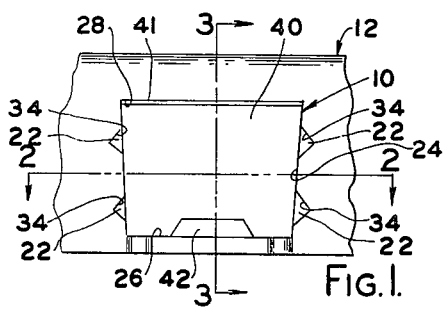
Figure 7:
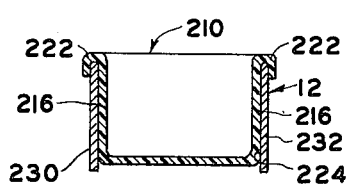
Figure 5:
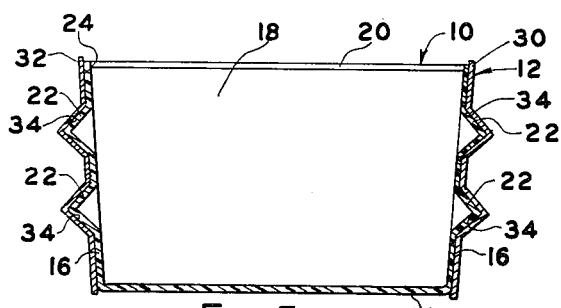

Still further objects and advantages of the present invention will readily occur to one skilled in the art to which the invention pertains upon reference to the following drawings in which like reference characters refer to like parts throughout the several views and in which, FIG. 1 is a front elevational view of one preferred glove box assembly of the present invention, FIG. 2 is a cross sectional view as seen substantially from line 2—2 of FIG. 1, FIG. 3 is a cross sectional view as seen substantially from line 3—3 of FIG. 1, FIG. 4 is a view as seen substantially from the bottom of FIG. 1, FIG. 5 is a cross sectional view taken substantially on line 5—5 of FIG. 2 and enlarged somewhat for purposes of clarity, FIG. 6 is a cross sectional view similar to FIG. 3 but illustrating another preferred embodiment of the present invention, FIG. 7 is a cross sectional view similar to FIG. 5 but illustrating still another preferred embodiment of the present invention, FIG. 8 is a fragmentary cross sectional view illustrating yet another preferred embodiment of the present invention.

Figure 9:
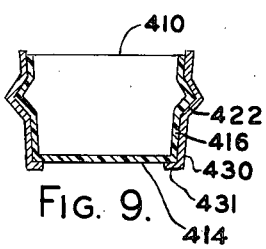

FIG. 9 is a cross-sectional view showing a further modification of the invention.

Now, referring to the drawings for a more detailed description of the present invention, FIGS. 1–5 illustrate one preferred embodiment as comprising a glove compartment device 10 as being carried in the dashboard 12 of an automobile or other vehicle in the conventional position for such devices.

The glove compartment device 10 preferably comprises a bottom portion 14, side walls 16 and a back portion 18 integrally formed to provide an open top and open front construction as shown. If desired, a flange 20 may be provided to extend substantially horizontally from the back portion 18 across a portion of the top of the box 10.

As can best be seen in FIG. 5, the side walls 16 are preferably formed to provide a pair of horizontally and outwardly extending rib portions 22. It is apparent that any number of such rib portions may be used. The dashboard 12 is preferably cut and stamped in a progressive operation to provide an opening 24 which receives the glove box 10. As can best be seen in FIGS. 3–4, the opening 24 is preferably progressively formed by cutting the dashboard to form horizontally extending edges 26 and 28. A vertical cut then can be made intersecting and substantially bisecting the horizontal edges 26 and 28 and the material then can be pushed inwardly to form a pair of spaced vertically extending walls 30 and 32. Each of the walls 30 and 32 is provided with recessed portions 34 as can best be seen in FIG. 5, which are complementary to and which frictionally engage the rib portions 22 of the box 10. In this way the glove box 10 is slidably received in the opening 24.

To limit inward sliding movement of the box 10 with respect to the opening 24, the bottom portion 14 of the box 10 is provided with a leading edge 36 which is substantially T-shaped in section as shown in FIG. 3. The T-shaped edge 36 extends across a portion only of the front of the box 10, as can best be seen in FIG. 4, and the edge 26 of the dashboard 12 is bent inwardly as at 38 to provide a stop which engages the edge 36 of the box 10 and limits inward movement thereof. It is apparent that the outer face of the box 10 may be slightly larger than the hole in the dashboard or may have outwardly extending lips or flanges to act as stops.

A door 40 is hingedly connected to the edge 28 of the dashboard 12, as at 41, to close the opening 24. The door 40 may be pivoted to the dotted line position shown in FIG. 3, to permit access to or removal of the glove box 10. The door 40 is preferably provided with an outwardly formed hand grip portion 42, eliminating the conventional snap or handle.

It is apparent that the glove box 10 illustrated in FIGS. 1–5 provides an improved construction over glove compartments heretofore used. The box 10 can be removed entirely from the opening 24 to facilitate the finding of articles carried therein. Further, a substantial reduction in manufacturing costs has been achieved in that the box 10 can be preformed of a relatively inexpensive material such as plastic or the like and then be positioned within the dashboard 12 with very little difficulty. All that is necessary is to provide a combined cutting and stamping operation to form the opening 24 and the recessed walls 30 and 32.

Another preferred construction is illustrated in FIG. 6 wherein a glove box 110 is shown as being positioned within the dashboard 19 of an automobile or other vehicle. In this embodiment the door 40 has been replaced by a front portion 140 of the box 110. The front portion 140 is provided with a recessed handle portion 142. Another means of retaining the box 110 within the opening 124 of the dashboard 12 is also illustrated in FIG. 6. The dashboard 12 is cut at two horizontally spaced and vertically extending cuts and then cut again to provide a cut intersecting and substantially bisecting the horizontal cuts to provide a pair of spaced wall portions 130 and 132 defined on three sides by the cuts made in the dashboard 12. The wall portions 130 and 132 are bent inwardly to a horizontal position to define the opening 124. The wall portions 130 and 132 frictionally and resiliently engage the side walls 116 and the floor portion 114 respectively of the box 110. The wall portion 130 may be bent as at 136 to provide access to the handle portion 142 as shown.

FIG. 7 illustrates yet another preferred embodiment of the present invention as comprising a glove box 210 provided with vertically extending side walls 216. Each of the side walls 216 is provided at its upper edge with a lip 222. The dashboard 12 is cut and stamped to form a pair of vertically extending wall portions 230 and 232 which define the opening 224. The lips 222 are shaped to extend over and around the upper edges of the wall portions 230 and 232 so that the box 210 is slidingly received in the opening 224.

FIG. 8 illustrates a construction similar to that shown in FIG. 7 but in which the box 310 is formed with side walls 316 provided at their upper edges with a substantially horizontally extending flange portion 322. The vertically extending wall portions 330 which define the opening 324 are provided at the upper edge with a horizontally extending flange portion 350 which engages beneath the flange portions 322 to slidingly retain the glove box 310.

The method of installing the boxes 210 and 310 shown in FIGS. 7 and 8 respectively is essentially the same as described above with respect to FIGS. 1–5 except in these embodiments it is not necessary to form respective recesses in the sidewalls 216 and 316 of the boxes 210 and 310.

FIG. 9 illustrates another modification in which the box 410 is formed with sidewalls 416 having ribs 422 and a bottom 414. The dashboard is made as in the other modifications but will have side walls 430 provided with inwardly extending flanges 431 on the lower edges for additional support of the box 410.

Although I have described but several embodiments of the present invention, it is clear from the above description that many other changes can be made without departing from the spirit of the invention as expressed by the scope of the appended claims.

I claim:
1. In combination
   (a) a dashboard for an automobile or the like,
   (b) said dashboard being cut and bent to form an opening defined by a pair of inwardly and vertically extending side walls,
   (c) an open top box and means slidably engaging said side walls and removably carrying said box in said opening,
   (d) said carrying means comprising
   said box being provided with a pair of vertically extending side walls spaced to engage said walls of said dashboard upon insertion of said box in said opening,
   said box side walls each being provided with at least one horizontally extending rib portion on the exterior surface thereof, and
   each of said side walls of said dashboard being provided with a horizontally extending recessed portion complementary to and frictionally resiliently slidingly receiving said rib portions.

2. The combination as defined in claim 1 and in which said box is of an open front construction and including a door hingedly carried by said dashboard and being pivotally movable to a position closing said opening.

3. The combination as defined in claim 1 and including means limiting inward sliding movement of said box with respect to said dashboard.

4. A method of installing a preformed open top box glove compartment having sidewalls provided with horizontally extending rib portions in the dashboard of an automobile or other vehicle comprising the steps of
   (a) cutting a pair of spaced horizontally extending slits in said dashboard,
   (b) cutting a vertically extending slit intersecting and substantially bisecting said horizontal slits to form two wall portions of said dashboard each defined on three sides by said slits,
   (c) pushing said wall portions inwardly into said dashboard to define an opening therein and until said walls are in planes substantially normal to the plane of said dashboard,
   (d) forming recesses in said wall portions complementary to said rib portions of said box, and
   (e) inserting said box in said opening in a position in which said rib portions are received by said recesses.

References Cited by the Examiner

UNITED STATES PATENTS

| | | | |
|---|---|---|---|
| 1,930,573 | 10/1933 | Weatherford | 296—37 |
| 2,111,434 | 3/1938 | Morrison. | |
| 2,202,277 | 5/1940 | Visser | 296—37 X |
| 2,301,730 | 11/1942 | Mann. | |
| 2,800,360 | 7/1957 | Jenkins | 296—37 |
| 2,944,865 | 7/1960 | Hammesfahr | 206—19.5 X |
| 3,049,188 | 8/1962 | Giannetti | 296—37 |

FOREIGN PATENTS 98,774   10/1961   Norway.

BENJAMIN HERSH, *Primary Examiner.*

A. HARRY LEVY, *Examiner.*